United States Patent [19]
La Porte et al.

[11] 4,143,710
[45] Mar. 13, 1979

[54] HEAT TRANSFER FIN STRUCTURE

[75] Inventors: Gerald E. La Porte, East Brunswick; Charles L. Osterkorn, N. Brunswick; Salvatore M. Marino, East Brunswick, all of N.J.

[73] Assignee: Fedders Corporation, Edison, N.J.

[21] Appl. No.: 766,955

[22] Filed: Feb. 9, 1977

[51] Int. Cl.² ............................................ F28F 01/36
[52] U.S. Cl. ............................ 165/182; 29/157.3 AH; 165/184
[58] Field of Search ....................... 165/184, 182, 181; 29/157.3 A, 157.3 AH, 157.3 B

[56] References Cited
FOREIGN PATENT DOCUMENTS

| 958125 | 9/1949 | France | 165/181 |
| 237258 | 4/1945 | Switzerland | 165/181 |
| 799,391 | 8/1958 | United Kingdom | 165/184 |

Primary Examiner—Albert W. Davis, Jr.
Attorney, Agent, or Firm—McAulay, Fields, Fisher & Goldstein

[57] ABSTRACT

An improved heat transfer fin structure of the type normally fabricated from sheet metal and wrapped about a conduit to provide enhanced heat transfer efficiency between the conduit and a fluid in contact with the conduit, has a plurality of elongated leg portions spaced apart from each other and openings defined in the space between the leg portions. The structure provides the advantage of high efficiency combined with high peripheral stability.

2 Claims, 5 Drawing Figures

HEAT TRANSFER FIN STRUCTURE

BACKGROUND OF THE INVENTION

This invention relates to an improved heat transfer fin structure of the type normally fabricated from sheet metal and operable to be secured to an object to provide increased effective surface area to the object for enhanced transfer of heat between the object and a fluid in contact with the object.

The invention relates more particularly to an improved heat transfer fin structure which not only has high heat transfer efficiency but also has relatively high peripheral stability or resistance to physical deformations.

In particular, in order to appreciate fully the inventive advance of the present invention over the previous heat transfer fin design, consideration is to be given to a number of related heat transfer fin structures which are of interest. It is noted that a large number of patents describing configurations for fin strips to be applied to tubing carrying a heat exchange medium to increase the heat transfer between the medium within the tube and a circulating, generally gaseous medium, which circulates over the fins, have been granted. The systems proposed by the prior art include fins struck from the surface of the tubing, tubing formed by wrapping and welding of the fin surface, and a large number of configurations which involve wrapping of the tubing with a fin strip or coiled wire. In each case, improved heat transfer between the fluid circulating through the tubing and the generally gaseous materials circulating over the fin surface is obtained.

However, as is apparent from the number of patents which have issued in this area, an optimum structure remained to be found. The problem which plagued the prior art systems, and which the instant invention endeavors to overcome, is the practical problem that the various structures devised to increase surface area resulted in a decreased peripheral stability of the structure. Structures devised which had high peripheral stability normally traded heat exchange efficiency for the enhanced stability. This problem can be best illustrated by the short review of a number of patents which reflect the prior art structures, which follows below. Only a few of the large number of issued patents in this field have been chosen for discussions as being somewhat representative of the various structures previously employed.

The structures which provide high heat exchange efficiency are normally of the bristle fin type of construction. The U.S. Pat. Nos. 2,234,423 to Wittmann and 2,247,243 to Kritzer both show a similar bristle type of structure wherein spikes or legs are disposed extending generally outwardly from a conduit to which it is desired to give enhanced heat exchange efficiency. As is well known in the art, the higher the surface area that is effectively displayed by the conduit, the greater will be the efficiency of heat exchange between the conduit and a fluid in contact with the conduit. The Mcturk U.S. Pat. No. 2,453,448 shows another similar structure wherein wires form a bristle-like heat exchange structure.

It is easily seen that the above noted structures may be easily physically deformed.

A considerably more robust structure, but one which has greatly decreased heat exchange efficiency is disclosed in U.S. Pat. No. 2,529,545, to Edwards. Edwards shows a solid spiral or disc structure secured to a conduit. The solid structure has much higher peripheral stability then the bristle type structures discussed above, but, as is well known, it has much lower heat exchange efficiency.

A large number of structures which are intermediate the solid spiral structure and the bristle structures, have been devised. Examples of the structures are such as the radiator spiral coil tube of Emmons et al. U.S. Pat. No. 1,960,305. Emmons et al. teaches an open box like structure which is spiraled around a conduit. The Brown U.S. Pat. No. 2,355,621 uses a multiplicity of elongated solid fins. Rodeck U.S. Pat. No. 2,372,795 uses a solid spiral which has been cut and expanded into a multiplicity of relatively wide leg portions. The Brown, Jr. U.S. Pat. No. 2,400,737 shows a structure similar to the Rodeck structure.

The expanded metal type of structure shown in the patent to Poole U.S. Pat. No. 2,471,582, has the advantage over previously discussed structures in that there is an increased effective area and increased peripheral stability, however, as is well known, such a structure has reduced heat exchange efficiency when compared with a bristle type of fin structure.

SUMMARY OF THE INVENTION

It is a principal object of the present invention to provide a heat transfer fin structure of the type normally fabricated from sheet metal and operable to be secured to and extending from an object to provide increased effective surface area to the object for enhanced transfer of heat between the object and a fluid in contact with the object.

A further object of the invention is to provide a fin structure which not only has high heat transfer efficiency but also relatively high peripheral stability.

Further objects and advantages of the invention will be set forth in part in the following specification and in part will be obvious therefrom without being specifically referred to, the same being realized and attained as pointed out in the claims hereof.

In the context of the above discussion, an improved heat transfer fin structure according to the present invention has a plurality of elongated leg portions spaced apart from each other and forming a row, and openings formed in the spaces between the spaced apart leg portions. This structure which appears to combine the strength of an expanded metal structure with the heat transfer efficiency of a bristle fin type of structure has, surprisingly, been found to have enhanced heat transfer efficiency when compared with a bristle fin type of structure of similar size.

BRIEF DESCRIPTION OF THE DRAWINGS

Other objects and advantages will become readily apparent and obvious to those skilled in the art from the following specification and claims which include a preferred embodiment of the present invention and from the accompanying drawings, in which:

DESCRIPTION OF THE PREFERRED EMBODIMENT

Figure 4:
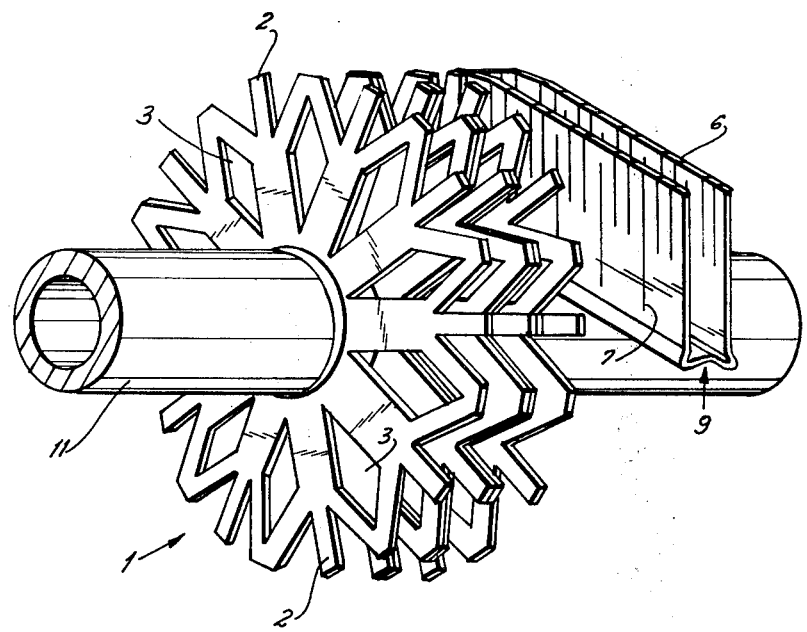
FIG. 4 is a perspective view of a heat transfer fin structure according to the instant invention which has been secured to a conduit and in position for being wrapped on the conduit.
Figure 5:
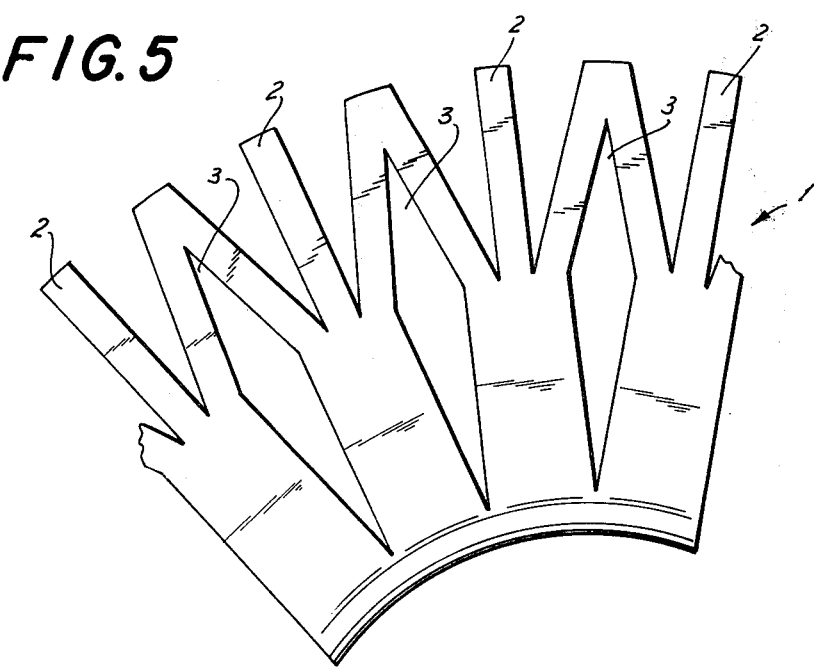
FIG. 5 is an elevational view of a heat transfer fin structure according to the instant invention.

In carrying the invention into effect in one of the embodiments which has been selected for illustration in the accompanying drawings and for description in this specification, and referring now particularly to FIG. 5, a heat transfer fin structure 1 has a plurality of elongated leg portions or spikes 2 which are spaced apart from each other and an opening 3 formed in the space between the elongated leg portions 2. In the preferred embodiment shown in FIG. 5, the openings have a diamond-like shape 3 which results from expanding a sheet metal strip prepared as described below. As can be seen in FIGS. 4 and 5, the longer axis of the diamond shape 3 is substantially equidistant from and in a plane defined by adjacent leg portions 2,2. Other suitable shapes for the opening 3 would be obvious to a worker in the art.

Figure 1:
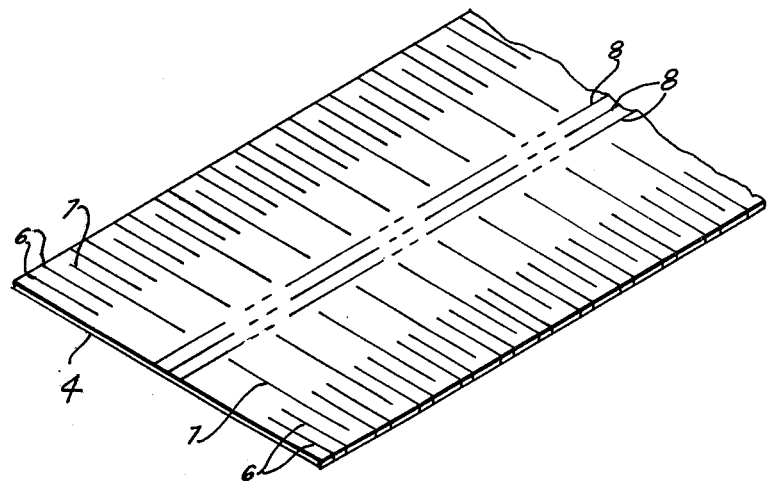
FIG. 1 is a perspective view of a piece of sheet metal which has been provided with slits and folding lines for producing a heat transfer fin structure according to the instant invention.

By way of illustration of a method for preparing a heat transfer fin structure according to the present invention, secured about a conduit, reference is now made to FIG. 1 wherein a sheet of metal 4 is provided with slits 6, 7 by any usual convenient way, such as cutting or stamping. Folding lines 8 may also be provided as is convenient and is normally practiced in the art.

Figure 2:
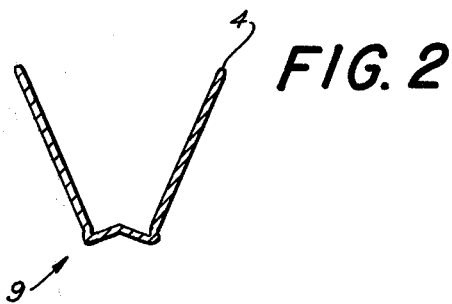
FIG. 2 is a sectional view of the sheet metal piece of FIG. 1 bent into a W-form in preparation for forming a structure according to the instant invention on a conduit.
Figure 3:
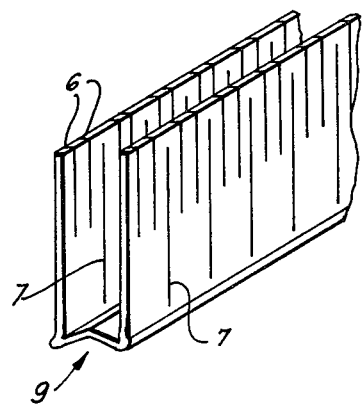
FIG. 3 is a perspective view of the folded sheet metal of FIG. 2.

The sheet metal piece 4 is thereafter folded into a W-shaped structure 9 as shown in FIGS. 2 and 3.

The thus folded sheet metal may then be wrapped in a spiral about a conduit 11, using any convenient conventional means, whereby the sheet metal strip expands to form a structure according to the present invention, as is illustrated in FIG. 4.

It is not intended to restrict the scope of the instant application to a heat transfer fin structure produced by expanding a sheet metal strip, as discussed above, as other methods of preparing the structure would be obvious to a worker in the art and would be dictated by the actual final use of the heat transfer fin structure.

As was pointed out above, in actual practice it was found that a heat transfer fin structure, according to the present invention, not only has enhanced peripheral stability with respect to a similar bristle type of fin structure, but surprisingly has greater heat exchange efficiency. This greater efficiency was determined by applying several standard comparison tests of the present invention fin structure compared with the bristle fin structure. The results of this comparison are tabulated below in the tables 1 and 2 wherein:

The number of turns represents the number of turns of the structure which was taken about conduit carrying a coolant fluid;

The linear feet entry is the number of feet of each fin structure used in the tests;

The cooling test in BTU's per hour entry is a measure of the heat exchange rate for each structure as determined by standard ARI test conditions for cooling;

The DISCH. PRESS. (PSIG) entry is the discharge pressure of the coolant fluid out of the compressor used for the test; and The DISCH.Tp-degrees F. entry is the temperature at which the particular coolant fluid condenses from a gas into a liquid and depends on the discharge pressure and the type of coolant fluid used; for these tests a coolant fluid available under the Dupont trade name of Freon 22, a Fluoro-Carbon gas was used.

Table 1 shows data using a Fedders three ton heat pump and Table 2 shows data using a Fedders five ton heat pump.

TABLE ONE

| FEDDERS MODEL CKH037B7A 3 TON HEAT PUMP | | |
|---|---|---|
| Surface | Present Invention | Bristle Fin |
| No turns | 18 | 19 |
| Linear Ft. | 152.5 | 160 |
| Cooling Test Btuh | 35069 | 33705 |
| Disch. Press. (Psig) | 270 | 282 |
| Disch. Tp-° F | 122.8 | 126.1 |

TABLE TWO

| FEDDERS MODEL CKH060B7A 5 TON HEAT PUMP | | |
|---|---|---|
| Surface | Present Invention | Bristle Fin |
| No Turns | 18 | 19 |
| Linear Ft. | 152.5 | 160 |
| Cooling Test Btuh | 53860 | 53286 |
| Disch. Press. | 312 | 313 |
| Disch. Tp-° F | 133.9 | 134.1 |

In performing the test, about 5.3% less surface material was used of the structure according to the present invention, however, a higher rate of heat exchange was recorded for the structure according to the present invention.

We wish it to be understood that we do not desire to be limited to the exact details of construction shown and described, for obvious modifications will occur to a person skilled in the art. In this respect it is not intended that the scope of the application be restricted only to the exact preferred embodiment structure shown, in particular the one to one relationship of openings to leg portions.

Having thus described the invention what we claim as new and desired to be secured by Letters Patent, is as follows:

1. In a heat transfer fin structure of the type normally fabricated from sheet metal and operable to be secured to and extending from an object to provide increased effective surface area to the object for enhanced transfer of heat between the object and a fluid in contact with the object, the improved configuration consisting of:

a plurality of elongated leg portions spaced apart from each other and forming a first row; and a plurality of openings defined by said structure, spaced apart from each other and disposed between adjacent leg portions, each said opening being elongated and substantially diamond shaped, with the longer axis of said diamond shape being substantially equidistant from and in a plane defined by adjacent leg portions.

2. In combination, a conduit and a heat transfer fin structure, said heat transfer fin structure being disposed circumferentially about at least a portion of said conduit and consisting of a plurality of elongated leg portions spaced apart from each other and forming a first row; and a plurality of openings defined by said structure, spaced apart from each other and disposed between adjacent leg portions, each said opening being elongated and substantially diamond shaped with the longer axis of said diamond shape being substantially equidistant from and in a plane defined by the adjacent of said leg portions.

* * * * *